(12) United States Patent
Ackermann et al.

(10) Patent No.: US 7,236,297 B1
(45) Date of Patent: Jun. 26, 2007

(54) GREGORIAN OPTICAL SYSTEM WITH NON-LINEAR OPTICAL TECHNOLOGY FOR PROTECTION AGAINST INTENSE OPTICAL TRANSIENTS

(75) Inventors: Mark R. Ackermann, Albuquerque, NM (US); Jean-Claude M. Diels, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 15 days.

(21) Appl. No.: 11/346,788

(22) Filed: Feb. 2, 2006

Related U.S. Application Data

(60) Provisional application No. 60/722,398, filed on Sep. 15, 2005.

(51) Int. Cl.
    *G02B 23/06* (2006.01)
(52) U.S. Cl. .................. 359/365; 359/364; 359/399
(58) Field of Classification Search ................ 359/365, 359/399, 423, 364
    See application file for complete search history.

(56) References Cited

U.S. PATENT DOCUMENTS 4,836,666 A * 6/1989 Meinel et al. .............. 359/365

OTHER PUBLICATIONS

Blanco, D. et al., "Advanced technology in the VATT," *SPIE* vol. 1236, *Advanced Technology Optical Telescopes IV* (1990), pp. 905-911.

Brzozowski, Lukasz et al., "Nonlinear Disordered Media for Broad-Band Optical Limiting," *IEEE Journal of Quantum Electronics*, vol. 36, No. 11, Nov. 2000, pp. 1237-1242.

Hernández, F. E. et al., "High-dynamic-range cascaded-focus optical limiter," *Optics Letters*, vol. 25, No. 16, Aug. 15, 2000, pp. 1180-1182.

Hill, J.M., "Optomechanics of the Large Binocular Telescope," *Proceedings of SPIE conference on Advanced Technology Optical Telescopes V*, 2199 [online], p. 64, 1994 [retrieved on Oct. 19, 2005]. Retrieved from the Internet: <URL: http://medusa.as.arizona.edu/ibtwww/tech/optomech.htm#opti>Chapter 2, Optics.

Linear and Non-Linear Optics of Organic Materials, SPIE Annual Meeting, Program Conferences, *Proceedings of SPIE*, vol. 4461 [online], 11 pages, SPIE Web Aug. 2001 [retrieved on Oct. 19, 2005]. Retrieved from the Internet: <URL: http://www.spie.org/conferences/Programs/01/am/confs/4461.html>.

Neto, N. M. Barbosa et al., "High-efficiency multipass optical limiter," *Optics Letters*, vol. 28, No. 3, Feb. 1, 2003, pp. 191-193.

(Continued)

*Primary Examiner*—Stephone B. Allen
*Assistant Examiner*—Joshua L Pritchett
(74) *Attorney, Agent, or Firm*—Carol I Ashby

(57) ABSTRACT

An optical system comprising a concave primary mirror reflects light through an intermediate focus to a secondary mirror. The secondary mirror re-focuses the image to a final image plane. Optical limiter material is placed near the intermediate focus to optically limit the intensity of light so that downstream components of the optical system are protected from intense optical transients. Additional lenses before and/or after the intermediate focus correct optical aberrations.

20 Claims, 3 Drawing Sheets

OTHER PUBLICATIONS

Soileau, M.J., Editor, "Nonlinear and Electro-Optic Materials for Optical Switching," *SPIE Proceedings*, vol. 1692 [online], 15 pages, 1992 [retrieved on Oct. 19, 2005]. Retrieved from the Internet: <URL: http://www.spie.org/web/abstracts/1600/1692.html>.

West, S.C. et al., "Progress at the Vatican Advanced Technology Telescope," *SPIE*, vol. 2871, 1997, pp. 74-85.

Wilson, R.N., *Reflecting Telescope Optics I: Basic Design Theory and its Historical Development*, published by Springer-Verlag Berlin Heidelberg (2000), ISSN 0941-7834.

\* cited by examiner

| # | Type | Comment | Radius of Curvature | Thickness | Glass | Semi-Diameter | Conic |
|---|---|---|---|---|---|---|---|
| 0 | STANDARD | | INFINITE | 1.00E+10 | | 0.0000 | 0.0000 |
| 1 | STANDARD | | INFINITE | 6000.0000 | | 0.0000 | 0.0000 |
| 2 | STANDARD | M1 | -10000.00 | -4861.3694 | MIRROR | 2000.5237 | -1.0261 |
| 3 | STANDARD | L1 | -117.3015 | -16.3066 | F_SILICA | 75.0000 | 0.0000 |
| 4 | STANDARD | | -217.2677 | -41.8871 | | 72.3420 | -1.7515 |
| 5 | STANDARD | L2 | -257.9557 | -9.2274 | F_SILICA | 50.7507 | 0.0000 |
| 6 | STANDARD | | -38.6341 | -52.6212 | | 41.4628 | -0.2364 |
| 7 | STANDARD | L3 | -57.4543 | -11.0351 | F_SILICA | 33.3837 | 0.0000 |
| 8 | STANDARD | | -762.2767 | -5.0000 | | 31.6871 | 0.0000 |
| 9 | STANDARD | L4-WINDOW | -70.8910 | -15.0000 | F_SILICA | 28.8883 | 0.0000 |
| 10 | STANDARD | Limiter | 198.1202 | -1.0000 | PMMA | 24.7147 | 0.0000 |
| 11 | STANDARD | Limiter | 198.1202 | -1.0000 | PMMA | 24.3658 | 0.0000 |
| 12 | STANDARD | L5-WINDOW | 198.1202 | -8.1625 | F_SILICA | 24.4872 | 0.0000 |
| 13 | STANDARD | | 765.4863 | -37.7906 | | 25.7629 | 0.0000 |
| 14 | STANDARD | L6 | -399.1478 | -11.2892 | F_SILICA | 33.8673 | 0.0000 |
| 15 | STANDARD | | 107.8055 | -16.5047 | | 34.8145 | 0.0000 |
| 16 | STANDARD | L7 | 45.4186 | -11.9077 | F_SILICA | 35.6528 | 0.0000 |
| 17 | STANDARD | | 219.4644 | -66.1648 | | 40.2892 | 0.0000 |
| 18 | STANDARD | L8 | 75.1387 | -14.2294 | F_SILICA | 66.1887 | -0.0370 |
| 19 | STANDARD | | 75.6652 | -527.0769 | | 71.8788 | 0.0000 |
| 20 | STANDARD | M2 | 1247.9142 | 5707.5726 | MIRROR | 370.7393 | -0.7159 |
| 21 | STANDARD | L9 | -384.8247 | 30.1969 | F_SILICA | 166.0832 | 0.0000 |
| 22 | STANDARD | | -814.7460 | 5.0000 | | 171.5092 | 0.0000 |
| 23 | STANDARD | L10 | 462.4484 | 78.3791 | F_SILICA | 175.3778 | 0.0000 |
| 24 | STANDARD | | 936.4413 | 1000.0000 | | 170.9530 | 0.0000 |
| 25 | STANDARD | SENSOR | INFINITE | | | 137.7655 | 0.0000 |

FIG.5

GREGORIAN OPTICAL SYSTEM WITH NON-LINEAR OPTICAL TECHNOLOGY FOR PROTECTION AGAINST INTENSE OPTICAL TRANSIENTS

RELATED APPLICATIONS

A provisional application was filed on Sep. 15, 2005, in the United States Patent and Trademark Office with Application Ser. No. 60/722,398.

GOVERNMENT RIGHTS LEGEND

This invention was developed under Contract DE-AC04-94AL85000 between Sandia Corporation and the U.S. Department of Energy. The U.S. Government has certain rights in this invention.

BACKGROUND

This invention relates generally to optical systems and, more particularly, to optical systems that are protected from intense optical transients by non-linear optical technologies.

Optical telescopes are used in research, commercial, and defense contexts for a variety of imaging and communications applications. Both imaging and non-imaging optical telescopes gather light within a field of view and focus it by means of optical elements onto a final focal plane where an optical sensor, such as a sensor array or a human eye, is placed. These features of conventional optical systems make them vulnerable to intense optical transients. For example, laser light that falls within the field of view of the telescope is gathered and focused by the optics of the telescope. The resulting concentration of optical energy can cause significant damage to components of the telescope, including the sensor array, or to other optical sensors, such as human eyes. For example, most remote sensing telescopes employ a sensor array positioned at the final focal plane, the position where the intensity of the incoming light is greatest. A laser beam of sufficient intensity within the field of view of the telescope can quickly overload and burn out such sensor array. In the case that an eye of a human observer is used directly as the optical sensor of the telescope, an unchecked intense optical transient could blind the observer.

Some of the traditional approaches to protecting optical systems from the threat of intense optical transients involve non-linear optical materials used as optical limiters to limit the optical intensity at the sensor array. In certain non-linear optical materials, the transmissivity of the material varies as a function of the intensity of the incident light. Certain non-linear optical materials are more transparent to low-intensity, ambient light but become more opaque as light intensity increases. These materials can be used to attenuate intense incident light. In other types of non-linear optical materials, the refractive index changes as a function of the light intensity. These materials can be used to defocus intense optical transients. Yet another class of non-linear optical materials has phase conjugating properties. These are traditionally gas cells which, when exposed to very intense optical radiation, both reflect and conjugate the optical phase of the incident light. To provide better response and greater protection, it is desirable to place the non-linear optical device where the intensity of the light is highly concentrated. Thus, the non-linear optical media is traditionally placed near a focal point such as just in front of the detector system.

Most of the optical telescopes used for remote sensing are of the aplanatic Cassegrain (Ritchey-Cretien or RC) design. These RC designs suffer from at least two principal problems when non-linear optical materials are used as protection against intense optical transients. First, these designs do not have a natural intermediate focal point. Therefore, additional relay imaging techniques are used to re-image the incoming light onto the final focal plane array. In many of the re-imaging approaches, the size of the protection device is roughly the same size as the focal plane array. Thus, in at least some systems, the non-linear optical device must be quite large. Second, although RC systems can be designed with shorter focal ratios (e.g., an f-number of F/3), RC systems used for remote sensing traditionally feature long focal ratios. For example, the Hubble Space Telescope, an orbital imaging satellite, features RC optics with an F/24 focal ratio. These slow optical systems result in large spot sizes and poor concentration of energy. The poor concentration of energy, in turn, results in a poor response of the non-linear optical materials which, in turn, decreases the degree of protection the non-linear material can provide against intense optical transients. In other words, at these low concentration ratios, the non-linear materials may not begin to "turn on" significantly until the laser intensity is already near or beyond the damage threshold for the optical sensor. Some of the more recent satellite-based telescopes feature a three mirror anastigmat (TMA) optical design. While markedly different from RC optical systems, these designs have the same disadvantages as RC optical systems when it comes to protection from intense optical transients.

Hence, there is a need for optical systems that facilitate improved performance of non-linear optical technologies for protection against intense optical transients. In addition, there is a need for optical systems which reduce the size of such non-linear optical devices.

SUMMARY OF THE INVENTION

The present invention overcomes the limitations of the prior art by providing a Gregorian telescope combined with non-linear optical materials to provide protection of components from abrupt increases in intensity of incoming light.

In one implementation, the Gregorian telescope comprises a primary concave mirror for collecting incoming light. The primary mirror is optically coupled to a secondary mirror. The secondary mirror is placed beyond the focal plane of the primary mirror. Light gathered by the primary mirror is reflected through the focal plane to the secondary mirror. The secondary mirror reflects the light from the primary mirror through an aperture in the primary mirror to a sensor array. A component (component B) is described as downstream from another component (component A) if a light beam first interacts with component A and then with component B. A non-linear optical material is placed at the focal plane of the primary mirror which is an intermediate focal plane for the system. The non-linear optical material has a response that protects the sensor array against intense optical transients. Light incident on the primary mirror intersects the non-linear optical material at the point along the optical path having the smallest spot size, which corresponds to maximum concentration of optical energy. Thus, the size of the non-linear optical material necessary to provide protection is reduced.

In one variation, the Gregorian telescope includes additional optical components on one or both sides of the non-linear optical material. These optical components can correct many of the inherent aberrations of the traditional Gregorian telescope. This has the effect of improving the image quality at the intermediate focal surface, thereby providing better concentration of the light and improving the functioning of the non-linear optical material.

BRIEF DESCRIPTION OF THE DRAWINGS

FIG. 5 is a table of the optical prescription of one embodiment of a modified Gregorian telescope in accordance with the present invention.

DETAILED DESCRIPTION OF THE PREFERRED EMBODIMENTS

The basic Gregorian telescope design consists of a concave primary mirror followed by a concave secondary mirror which is located after the focus of the primary mirror (the prime focus or intermediate focus). The secondary mirror re-focuses the image to a final image plane and slows the overall optical system focal ratio. Gregorian telescopes have been traditionally disfavored because of optical aberrations. The uncorrected Gregorian system has a poor image quality off axis and a rather narrow field of view. Both result in part from the inherent tendency of the Gregorian telescope to have a curved focal surface due to the overall system Petzval radius being non-zero. These problems are also addressed by some embodiments of the present invention, as described below.

Figure 1:
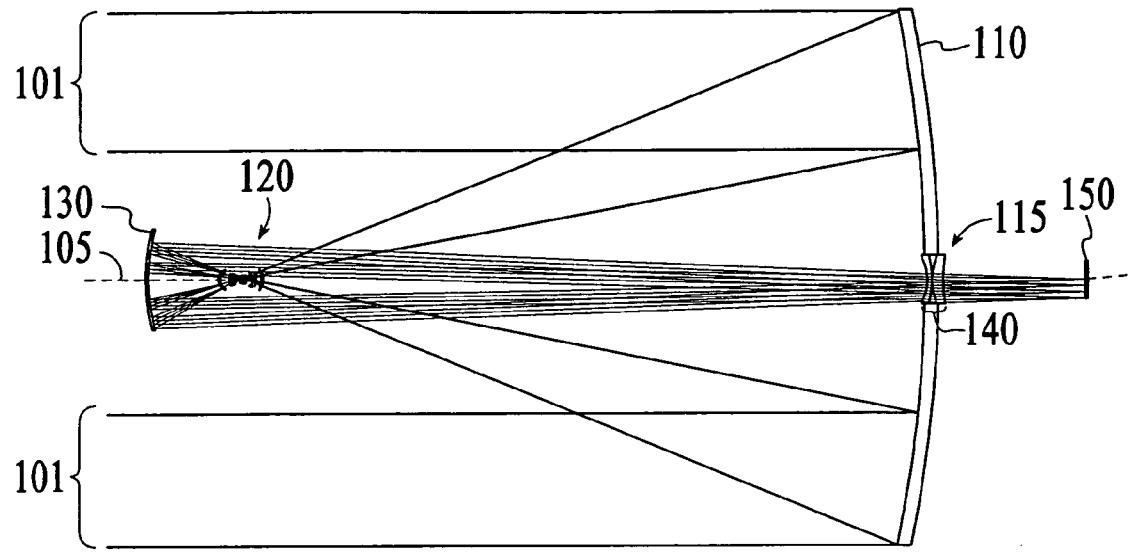
FIG. 1 is an optical layout illustrating one embodiment of a modified Gregorian telescope in accordance with the present invention.

FIG. 1 shows one embodiment of a modified Gregorian telescope 100 in accordance with the present invention. This design is applicable to systems with focal lengths from a fraction of a meter to hundreds of meters. The telescope 100 includes a primary concave mirror 110 optically coupled through an intermediate focus 120 to a secondary concave mirror 130, which is further optically coupled through a combination of lenses 140 to a final focus 150 located on the far side of an aperture 115 in the primary concave mirror 110. In one embodiment, the primary mirror 110 and secondary mirror 130 share a common optical axis 105, as does the aperture 115 and the lens combination 140. In an alternate embodiment, an off-axis design is used. Off-axis designs can provide higher dynamic range and have certain advantages for infrared imaging systems.

In one embodiment, the primary mirror 110 has a parabolic curvature and the secondary mirror 130 has an elliptical curvature. In some embodiments, the shape of the primary mirror 110 can also be spherical or elliptical and the shape of the secondary mirror 130 can be spherical. In other embodiments, the shapes of the primary and secondary mirror surfaces can be spherical elliptical, parabolic, hyperbolic, or general pholynomial aspheric. The proper combination of shapes for the primary and secondary mirror surfaces for a particular embodiment is determined by optical modelling using methods known to those skilled in the art. The secondary mirror 130 is appropriately sized and positioned so that light reflecting off the primary mirror 110 is incident on the secondary mirror 130.

Light rays 101 within the field of view enter the telescope 100. In one embodiment, telescope 100 is configured to have a field of view of approximately two degrees, but other embodiments have narrower or wider fields of view. Light rays 101 that are incident on the primary mirror 110 are reflected back through the intermediate focus 120 to the secondary mirror 130. Light rays 101 are further reflected by the secondary mirror 130 through aperture 115 and through the lens combination 140 to the final focus 150. In various embodiments, a sensor array (not shown) is positioned at the final focus 150. The sensor array comprises any type of sensor known to those of skill in the art, including but not limited to a human eye, film, a spectrograph including fiber optic fed spectrographs, and electro optical imaging devices such as CCDs, CMOS imaging sensor arrays, and sold state infrared sensor arrays of various types. The wavelength of light rays 101 can range for example from ultraviolet through visible to long wavelength infrared. In one embodiment, a sensor array that detects light only within the visible spectrum is used with telescope 100. In alternative embodiments, light rays 101 can range in wavelength from 150 nm to 100 μm.

Figure 2:
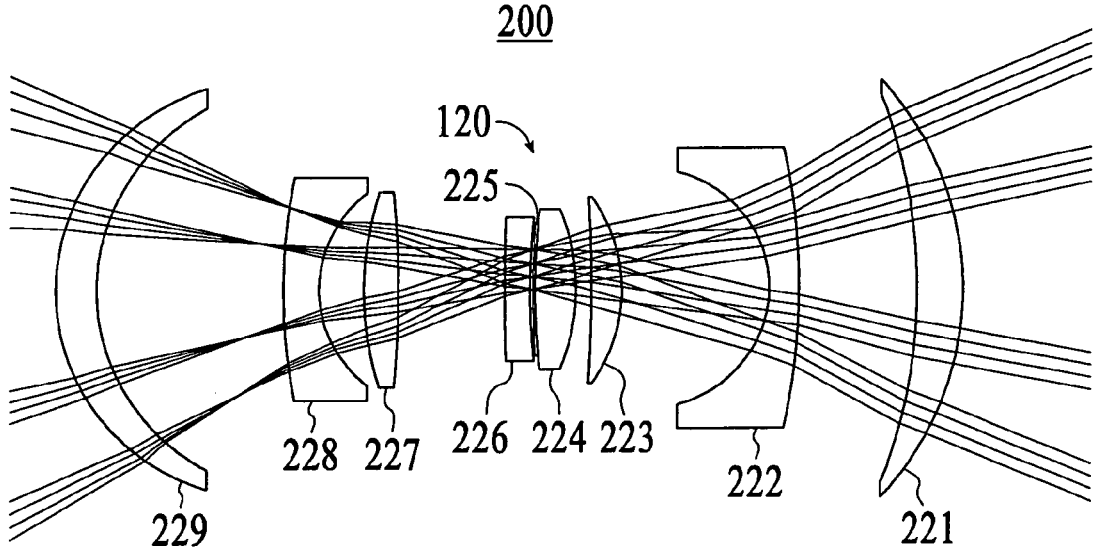
FIG. 2 is a close-up of the intermediate focal region of the modified Gregorian telescope of FIG. 1.

FIG. 2 shows an example of an intermediate focus region 200 of the modified Gregorian telescope 100 of FIG. 1. One or more optical elements can be placed in the intermediate focus region 200. For example, in the embodiment shown in FIG. 2, multiple optical components are positioned around a non-linear optical material that is used as an optical limiter to protect the sensor array from intense optical transients. This embodiment comprises a four-lens prime focus corrector including lenses 221, 222, 223, and 224 positioned before the focus 120 and a four-lens corrector for the secondary mirror 130 comprising lenses 226, 227, 228, and 229 positioned after the focus 120.

In FIG. 2, the optical limiter material 225 is located at the intermediate focus 120, and is represented here by two slightly curved rectangles. The term, "at" focus means within the Rayleigh range of the focus. The distance within which the image size remains smaller than 1.4 times its smallest size is called the Rayleigh range. In this embodiment, the limiter material 225 is curved to follow the contours of the intermediate focal surface. In another variation of design, the intermediate focal surface can be flattened, and a flat layer of limiter material 225 can be used. In one embodiment, the optical limiter material 225 is one layer which can be either thinner or thicker than the layer shown in FIG. 2.

Different types of non-linear optical materials can be used to protect against intense optical transients. For example, some materials become more opaque with intensity and therefore attenuate more intense light. Alternatively, plastics with non-linear indices of refraction can be used to defocus intense optical beams. In alternative embodiments, argon gas, various hydrocarbon gases, liquid crystal materials, non-linear optical crystals, or other materials characterized by a non-linear response to incident light intensity can be used, including but not limited to liquids and gels. In particular, materials characterized by a non-linear index of refraction in response to incident light intensity can be used to distort and defocus incident light. These materials, also referred to as n2 materials, can also be used as the protection mechanism for the sensor array. In some implementations, the lenses 224 and 226 closest to the non-linear optical material 225 may act as windows to the non-linear optical material 225 and can be used to restrain or position the non-linear optical material 225, for example if a liquid or gas material 225 is used.

In alternative designs, more or fewer lenses can be used in the intermediate focus region 200 than shown in FIG. 2. Generally, designs for faster optical systems and greater fields of view tend to include more optical elements than slower optical systems and narrower fields of view, but many designs are possible. The performance of the modified Gregorian system can be improved to be at least competitive with more traditional imaging designs in terms of image quality. Lens assemblies consisting of one or more lenses can correct many of the inherent aberrations of the Gregorian system, thereby increasing the useful field of view.

For example, lens assemblies consisting of one or more lenses or lens elements before the intermediate focus can partially correct aberrations due to the primary mirror. Lens assemblies consisting of one or more lenses between the intermediate focus and the secondary mirror can correct aberrations due to the secondary mirror. Lens assemblies after the secondary mirror and before the focal plane can perform final corrections of residual aberrations and flatten the field. The combined effects of the lens assemblies are considered in order to reduce or eliminate chromatic aberrations. In one embodiment, the lens elements before the intermediate focus are designed before the lens elements following the intermediate focus are designed. The design of the elements before the intermediate focus is used to achieve a high concentration of optical energy in the non-linear layer. The design of the elements after the intermediate focus is used to achieve a high image quality at the final focus.

Advantages of the Gregorian optical system for laser protection are that it has a natural intermediate focus and the primary mirror operates at a faster (a lower valued) effective focal ratio. In one embodiment, the primary mirror 110 has a focal ratio between F/0.5 and F/4 and the overall telescope 100 has a focal ratio between F/4 and F/50. For example, the primary mirror in one embodiment can have a focal ratio F/1. The fast prime focus means that incident laser energy will be more highly concentrated to activate the non-linear optical material than with comparable conventional RC Cassegrain or TMA optical configurations. Also, because a faster image plane is present in these Gregorian designs, the lateral extent of the intermediate image is smaller than that of the final image which means that the lateral extent of the non-linear optical material can be smaller than that used with other approaches. Moreover, the smaller the focal ratio of the primary mirror and the larger the focal ratio of the overall system, the greater the ratio between the size of the protection filter and the size of the sensor array.

For example, rather than employing an RC Cassegrain design operating at a relatively slow but typical focal ratio of F/13, some embodiments of the present invention use the modified Gregorian optical design with the primary mirror operating at, for example, F/1.25 for the intermediate focus and a final focal ratio of F/13. This would allow for an increase of 108 times the focused laser energy into the non-linear optical layer as compared to the RC Cassegrain approach. It also results in over a one-hundred-fold reduction in the area (a ten-fold reduction in linear dimension) of the protective material. As many non-linear materials are difficult and expensive to acquire in large sizes, this represents another advantage of some embodiments of the present invention.

Figure 3:
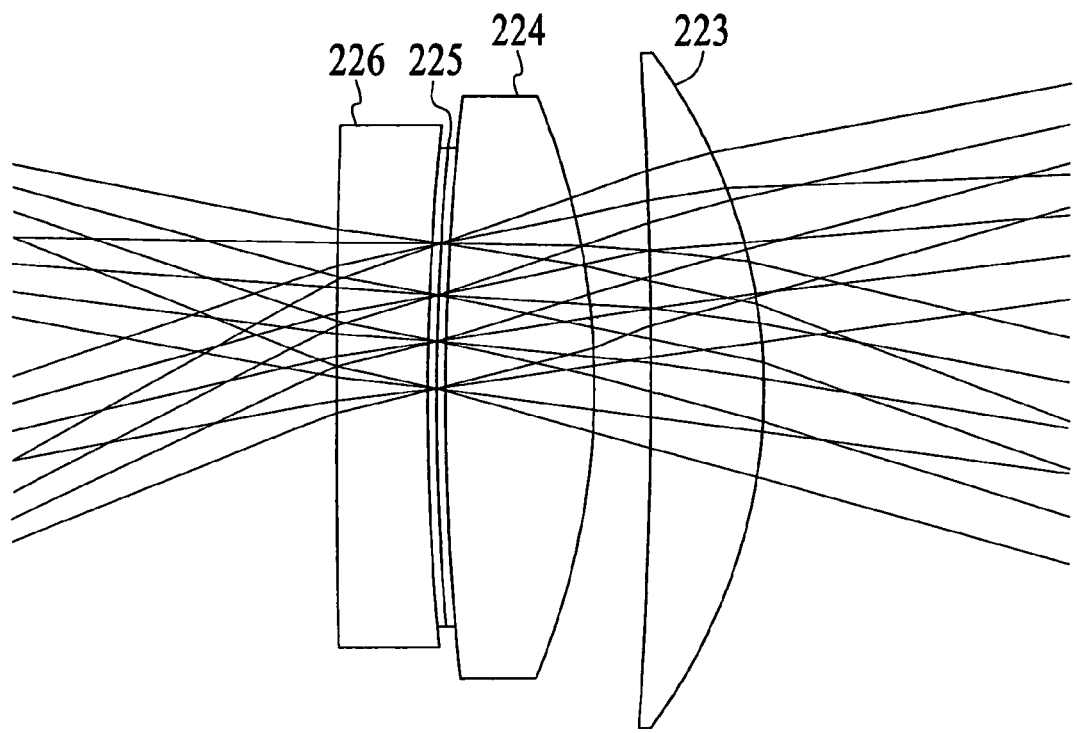
FIG. 3 is a further close-up of the limiter layer of FIGS. 1 and 2.

FIG. 3 shows a further close up of the limiter layer of FIGS. 1 and 2. The optical rays 101 are concentrated in or near (within the Rayleigh range) the limiter layer 225, particularly at the center of the limiter layer 225, but the optical rays 101 are less concentrated at the last lens 224 before the limiter layer 225. Table 1 presents the RMS radius of six field points at the intermediate focus and at the last lens surface before the optical limiter material 225 in one embodiment.

TABLE 1

RMS Radius at Intermediate Focus and at the Last Lens Surface Before the Intermediate Focus

| Field Point | RMS Radius (μm) of Spot Diagram at Intermediate Focus | RMS Radius (μm) of Spot Diagram at Last Lens Surface Before Limiter |
|---|---|---|
| 0.0000 deg | 3.010 | 186.267 |
| 0.0500 deg | 3.876 | 184.915 |
| 0.0800 deg | 4.512 | 184.176 |
| 0.1000 deg | 4.713 | 183.266 |
| 0.1250 deg | 4.790 | 181.881 |
| 0.1500 deg | 5.792 | 179.939 |
| | AIRY RADIUS = 0.976 μm | AIRY RADIUS = 0.976 μm |

The RMS radii of the spot diagram at the intermediate focus indicate this design achieves a very high concentration of optical energy in the limiter layer 225. This concentration of optical energy into a small spot size at an intermediate focus enables a strong response of the optical limiter 225 and enables a reduction in the physical dimensions of the optical limiter 225. Further improvement of the image quality at the intermediate focus is possible, for example, by selecting glass materials other than fused silica or by increasing the number of lenses in the prime focus corrector. The large RMS radii of the spot diagram at the last lens surface before the optical limiter indicates that the optical energy is not highly concentrated at this surface. If optical rays 101 are too highly concentrated in lens 224, the lens 224 may be damaged by an intense optical transient. The concentration of optical rays 101 in the last lens 224 can be reduced by using a thicker limiter layer 225 or greater spacing between the limiter layer 225 and lens 224.

Figure 4:
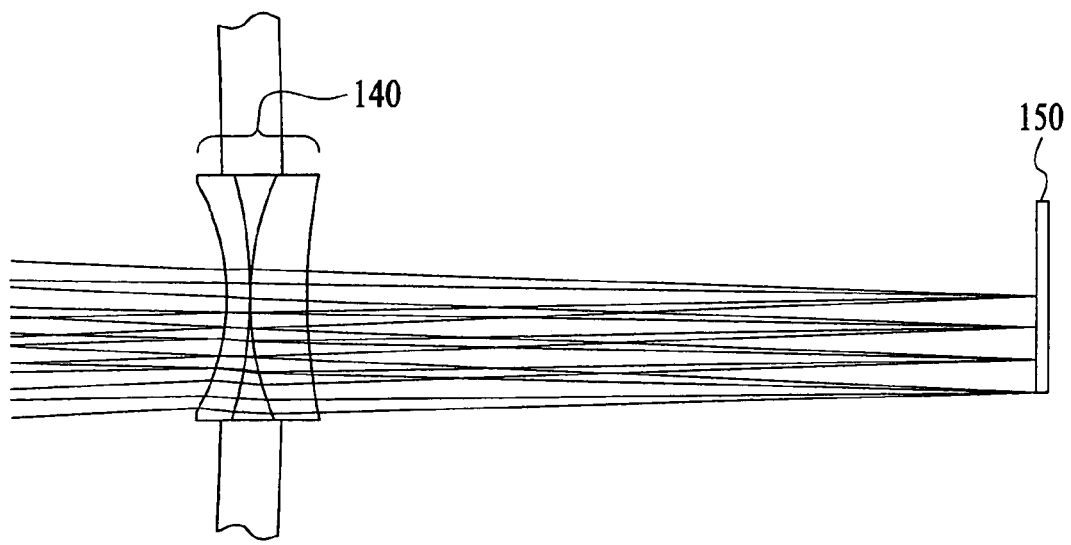
FIG. 4 is a close-up of the lens corrector/flattener and focal surface of the modified Gregorian telescope of FIG. 1.

FIG. 4 is a close-up of the lens corrector/flattener 140 and the final focus 150 of the modified Gregorian telescope of FIG. 1. In one embodiment, the combination of lenses 140 is used to flatten the final focal surface and improve field of view. Alternatively or additionally, a lens or a group of lenses can be used to provide final correction of other aberrations. Various designs include one, two, or more lenses to improve the image quality at the final focus 150.

In embodiments where the non-linear optical material has purely an attenuation effect, activation of the non-linear material will not affect the quality of the final focus 150 but the amount of light that reaches the final focus 150 will be significantly reduced. Therefore, the intensity of light at the final focus 150 will also be reduced.

In embodiments where the non-linear optical material has purely a phase effect (e.g., change of index of refraction or defocusing), the amount of light reaching the final focal plane 150 will not be significantly reduced but will be spread out over a greater area, thus reducing the intensity. Table 2 below presents the RMS radius for the spot diagram of six field points at the final focus 150 in two situations: where the index of refraction of the non-linear optical material has not changed and where the index of refraction has changed 4%.

TABLE 2

RMS Radius at Final Focus with No Change in Index of Refraction and with 4% Change in Index of Refraction

| Field Point | RMS Radius (μm) of Spot Diagram at Final Focus with No Change in Index of Refraction. | RMS Radius (μm) of Spot Diagram at Final Focus with 4% Change in Index of Refraction. |
| --- | --- | --- |
| 0.0000 deg | 14.858 | 151.849 |
| 0.0500 deg | 21.499 | 146.222 |
| 0.0800 deg | 26.438 | 141.125 |
| 0.1000 deg | 26.938 | 138.703 |
| 0.1250 deg | 23.686 | 140.046 |
| 0.1500 deg | 26.145 | 147.251 |
| | AIRY RADIUS = 9.530 μm | AIRY RADIUS = 9.545 μm |

As shown in this table, a change in the index of refraction of 4% results in approximately a 6-fold increase in the RMS radius of the spots. This yields approximately a 36-fold decrease in intensity at the final focus. This design can be used, for example, for a satellite-based telescope looking at the earth.

FIG. 5 is the optical prescription of the modified Gregorian telescope shown in the embodiments in FIGS. 1-4 and is based on a 4 meter aperture. Other designs based on other design parameters will be apparent to those skilled in the art. This prescription is presented in a format consistent with the commercial optical design software program known as ZEMAX®, available from ZEMAX Development Corporation, Bellevue, Wash. M1 corresponds to the primary mirror 110, L1-L4 correspond to lenses 221-224 respectively, L5-L8 correspond to lenses 226-229 respectively, M2 corresponds to secondary mirror 130, and L9 and L10 correspond to the two lens combination 140. In the prescription, PMMA, a clear plastic, is used as a place holder for the non-linear material 225 for design purposes. Prior to building the modified Gregorian system, the desired non-linear material 225 would be designed into the system in the place of the PMMA between L4 and L5.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents. Furthermore, no element, component or method step is intended to be dedicated to the public regardless of whether the element, component or method step is explicitly recited in the claims.

What is claimed is:

1. A telescope comprising:
a concave primary mirror for gathering light within a field of view of the telescope and focusing the light within a Rayleigh range of an intermediate focus;
a concave secondary mirror positioned downstream from the intermediate focus for re-focusing the light to a final focus, wherein the concave primary mirror has a faster focal ratio than the concave secondary mirror;
an optical limiter located within the Rayleigh range of the intermediate focus; and
at least one optical component positioned in at least one location for at least partially correcting aberrations, the at least one location being situated between the optical limiter and a mirror selected from the group consisting of the concave primary mirror and the concave secondary mirror.

2. The telescope of claim 1, wherein the at least one optical component is positioned between the concave primary mirror and the optical limiter and is a lens assembly for at least partially correcting aberrations due to the concave primary mirror.

3. The telescope of claim 1, wherein the at least one optical component is a lens assembly for at least partially correcting aberrations at the intermediate focus.

4. The telescope of claim 1, further comprising:
a field flattening lens assembly positioned between the concave secondary mirror and a final focus.

5. The telescope of claim 1, further comprising:
at least two optical components positioned between the concave primary mirror and the optical limiter; and
at least two optical components positioned between the optical limiter and the concave secondary mirror.

6. The telescope of claim 5, wherein at least one of the optical components is a lens assembly for at least partially correcting chromatic aberration.

7. The telescope of claim 1, wherein the at least one optical component is positioned between the optical limiter and the concave secondary mirror and is a lens assembly for at least partially correcting aberrations due to the concave secondary mirror.

8. The telescope of claim 1, wherein the optical limiter has an index of refraction that changes in response to an intensity of the light within the Rayleigh range of the intermediate focus.

9. The telescope of claim 8, wherein the index of refraction of the optical limiter causes a defocus of the light at the final focus.

10. The telescope of claim 1, wherein the optical limiter causes a change in an attenuation of light intensity in response to an intensity of the light within the Rayleigh range of the intermediate focus.

11. The telescope of claim 1, wherein the optical limiter changes a light phase conjugation in response to an intensity of light within the Rayleigh range of the intermediate focus.

12. The telescope of claim 1, wherein the optical limiter changes a scattering of light in response to an intensity of the light within the Rayleigh range of the intermediate focus.

13. The telescope of claim 1, further comprising:
a sensor array located within a Rayleigh range of the final focus.

14. The telescope of claim 1, wherein the concave primary mirror comprises a mirror surface shape selected from spherical, elliptical, parabolic, hyperbolic, and general polynomial aspheric.

15. The telescope of claim 1, wherein the concave secondary mirror comprises a mirror surface shape selected from spherical, elliptical, parabolic, hyperbolic, and general polynomial aspheric.

16. The telescope of claim 1, wherein the concave primary mirror has a focal ratio between F/0.5 and F/4.

17. The telescope of claim 1, wherein the telescope has a focal ratio between F/4 and F/50.

18. The telescope of claim 1, wherein a field of view of the telescope is approximately two degrees.

19. An optical system comprising:
a Gregorian telescope having a first mirror, a second mirror and an intermediate focus located between the first and second mirrors;
an optical limiter positioned within a Rayleigh range of the intermediate focus; and at least one optical component positioned in at least one location, wherein the at least one optical component is a lens assembly for at least partially correcting aberrations and wherein the at least one location is situated between the optical limiter and a mirror selected from the group consisting of the concave primary mirror and the concave secondary mirror.

20. The optical system of claim 19, wherein the at least one optical component is a lens assembly positioned within the Rayleigh range of the intermediate focus for correcting aberrations generated by at least one of the concave primary mirror and the concave secondary mirror.

* * * * *